Aug. 29, 1961  L. A. KOVNER  2,998,046
SCROLLING MACHINES
Filed May 29, 1956  4 Sheets-Sheet 3
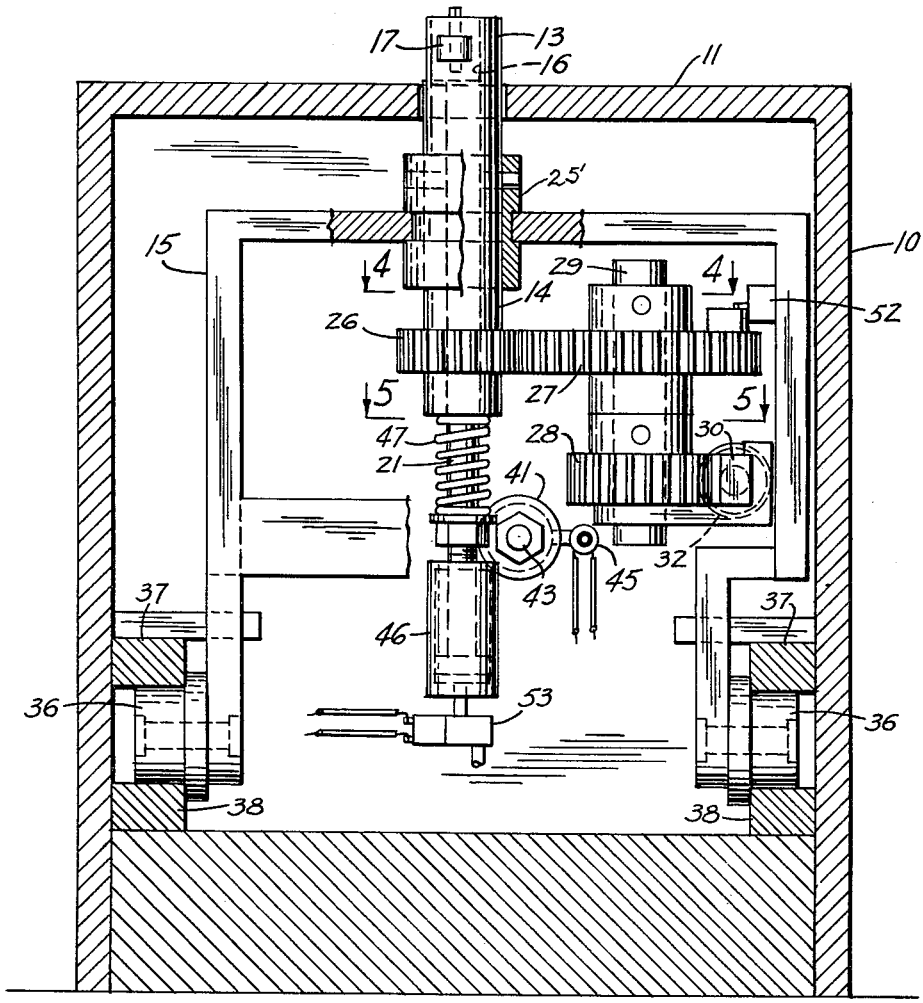
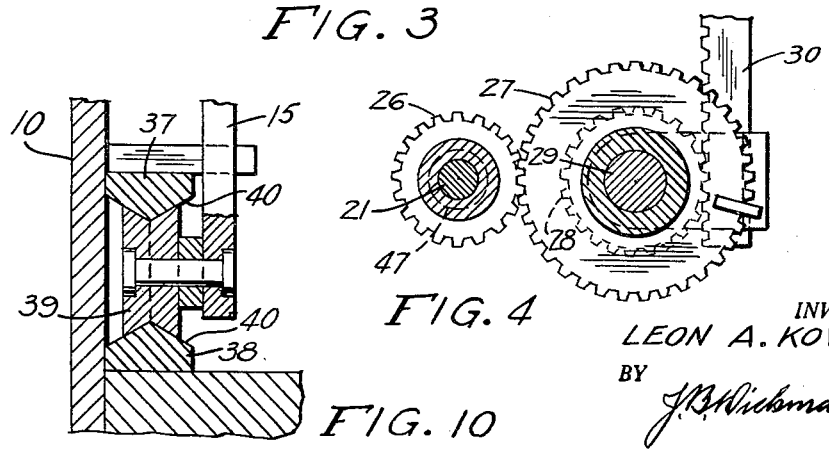
INVENTOR.
LEON A. KOVNER
BY
J.B.Wickman Jr
ATTORNEY Aug. 29, 1961   L. A. KOVNER   2,998,046
SCROLLING MACHINES
Filed May 29, 1956   4 Sheets-Sheet 4

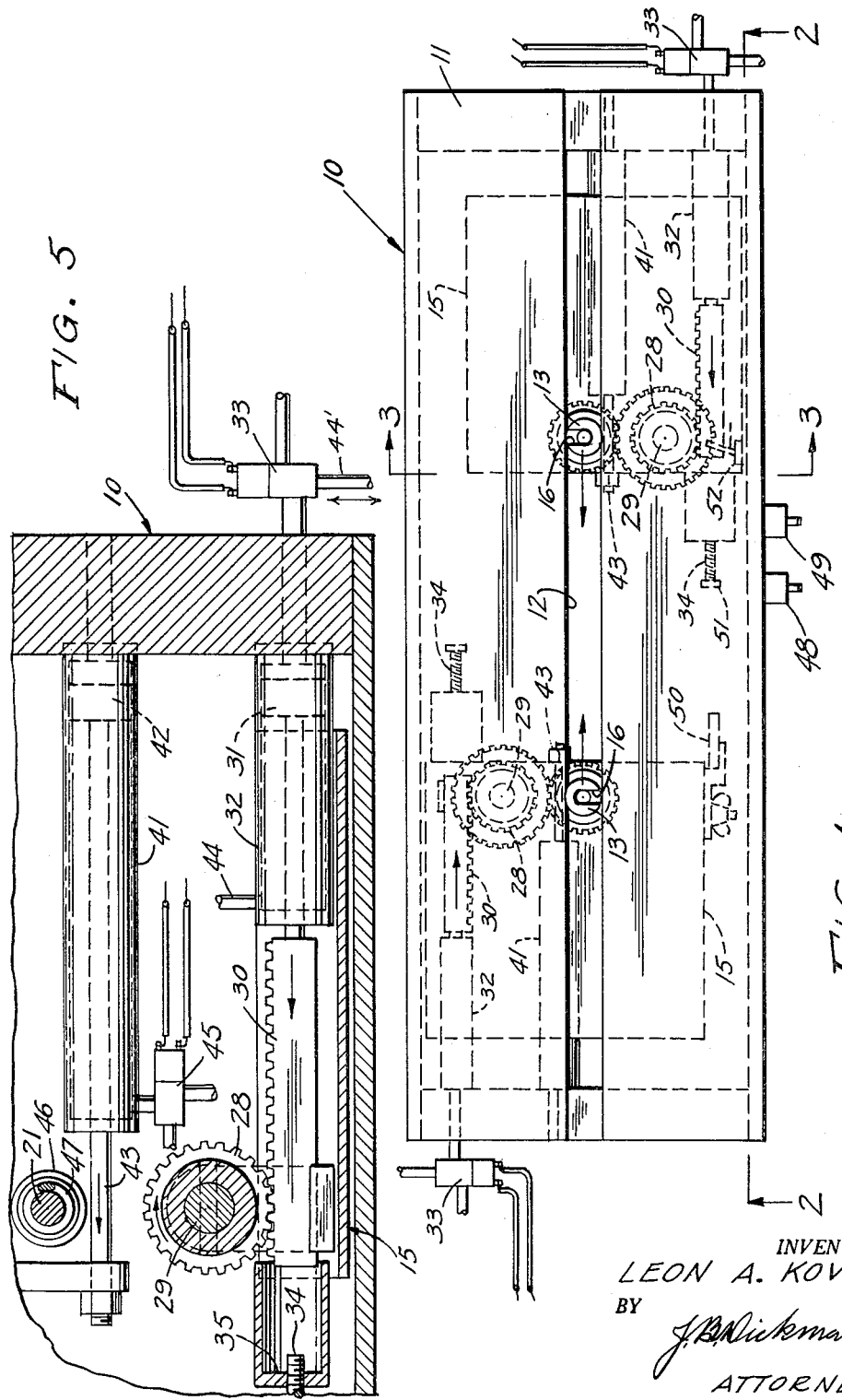

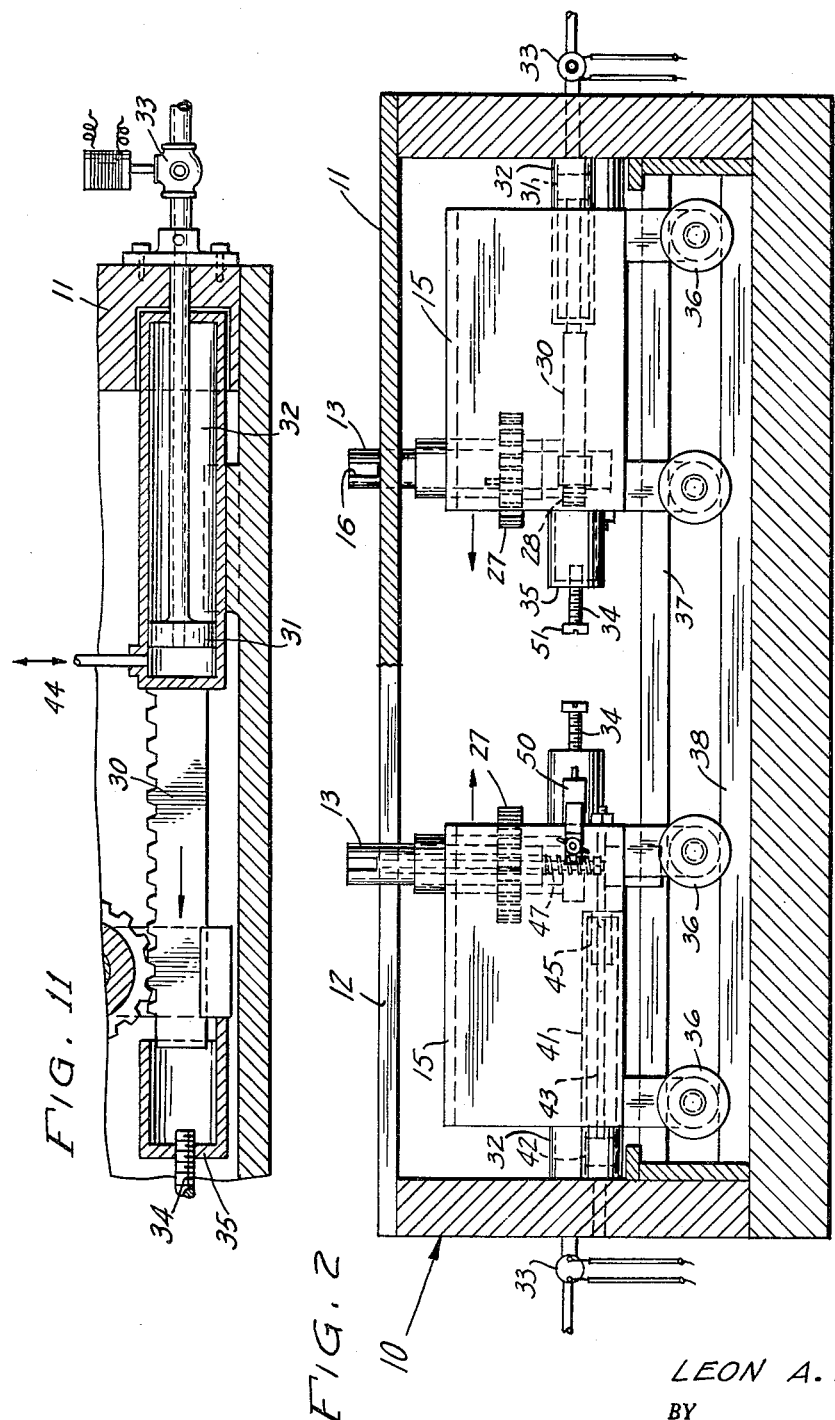

INVENTOR.
LEON A. KOVNER
BY
*J.B.Dichman Jr.*
ATTORNEY

United States Patent Office 2,998,046
Patented Aug. 29, 1961

2,998,046
SCROLLING MACHINES
Leon A. Kovner, 42–44 N. Cameron St., Harrisburg, Pa.
Filed May 29, 1956, Ser. No. 588,172
10 Claims. (Cl. 153—40)

This invention relates to scrolling machines adaptable for bending strips of iron into spiral and similarly formed curves for ornamental structures and the like.

The principal object of this invention is to provide means for automatically performing a scrolling operation on one end or both ends of a strip of metal, in accordance with any desired scroll pattern for which the means may be set.

Another object is to provide the above means with automatic scroll releasing means operable after the scrolling operation has been performed.

Another object is to provide two opposed jaw means for gripping the opposite ends of the metal strip blank and use power means for turning said jaws to bend the ends about properly curved anvils mounted on said jaws, while providing suitable axial movement of said jaws toward each other to permit the spiraling of said ends to the desired extent.

Another object is to make a table frame having a pair of jaw carriages mounted under the table for axial movement and carrying rotatable jaws on vertical axes extending upwardly through an axial slot in the table.

A further object is to form the above jaws by providing a radially extending slot in one side of the end of a vertical shaft, and mount a knurled cam in one side of said slot and having its edge extending into the slot so that it may be wedged against a strip end inserted into said slot to grip it firmly when starting the scrolling operation.

Another object is to provide power means for turning said jaws with adjustable control means to limit the amount of turning applied to each jaw.

Another object is to provide automatic means responsive to completion of the jaw turning operation, to release the scrolled strip from the jaws.

Another object is to provide power controls for moving said jaw carriages outwardly to properly return them to starting position after a scrolled strip has been released.

Another object is to provide a braking force on the carriages during the scrolling action to produce a tension on the strip and keep it straight between the spirals to the end of the scrolling operation.

Figure 6:
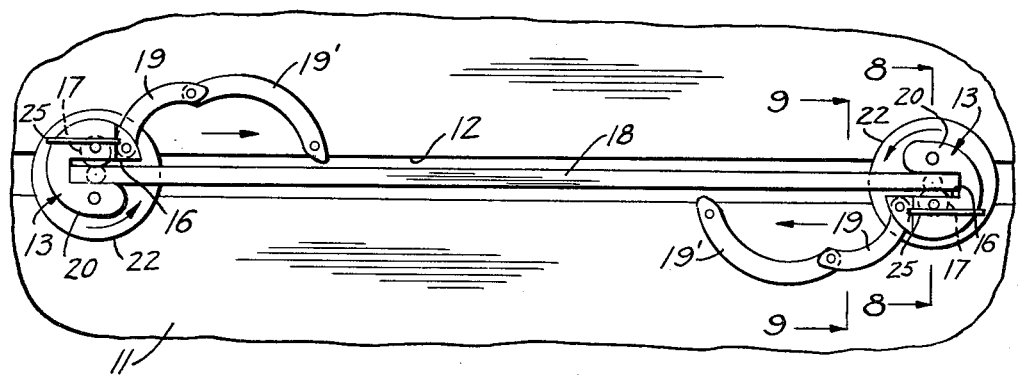
Figure 7:
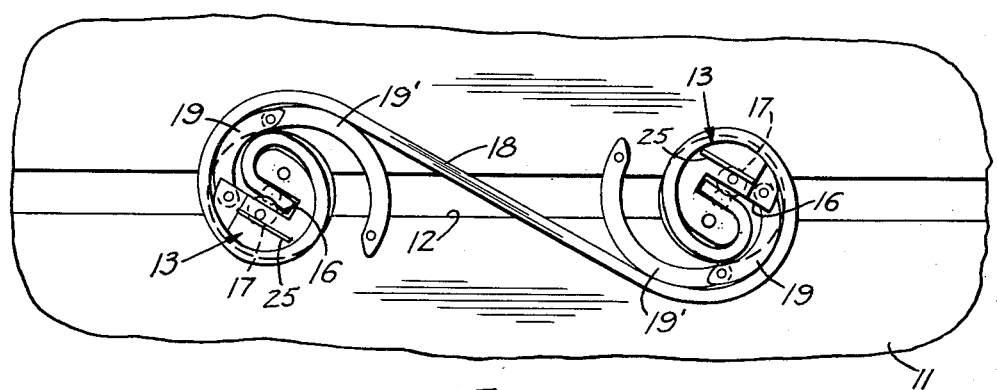
Figures 8, 9:
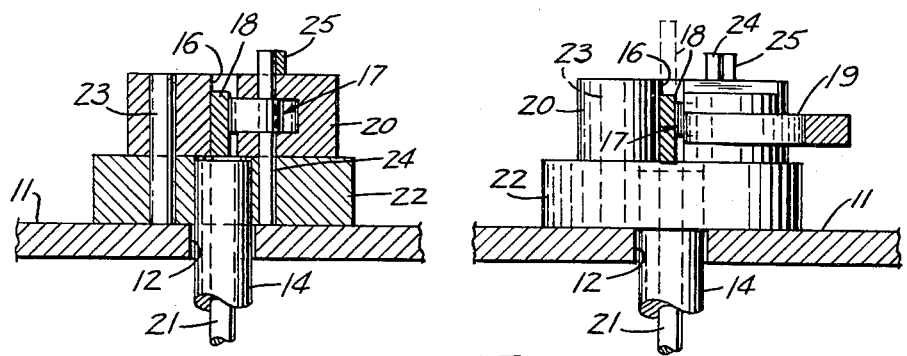

Other and more specific objects will become apparent in the following detailed description of a preferred form of the invention, as illustrated in the accompanying drawings, wherein:

FIGURE 1 is a plan view of the scrolling machine,
FIGURE 2 is a vertical sectional view of the machine taken on the line 2—2 of FIGURE 1,
FIGURE 3 is a vertical sectional view of the machine taken on the line 3—3 of FIGURE 1.
FIGURE 4 is a horizontal sectional view of some details taken on the line 4—4 of FIGURE 3.
FIGURE 5 is a horizontal sectional view taken on the line 5—5 of FIGURE 3,
FIGURE 6 is a plan view of the central portion of the table top with a strip inserted in place in the jaws at the start of a scrolling operation,
FIGURE 7 is a similar view with the jaws and strip in the final steps of the operation,
FIGURES 8 and 9 are detail sectional views taken on the lines 8—8 and 9—9 in FIGURE 6, and
FIGURE 10 shows a detail sectional view through a modified form of sheave and tracks therefor.
FIGURE 11 is a horizontal sectional view similar to FIGURE 5, but showing a modified form of the invention.

The device illustrated comprises a frame 10 having a table top 11 with straight slot opening 12, through which protrude two jaws 13 mounted on rotatable vertical shafts 14, which are carried by axially movable carriages 15.

Each jaw may be simply a vertical slot 16 in the end of shaft 14, substantially radially directed through one side thereof, or in a disc 20 attachable thereto, and an eccentric knurled cam 17 mounted on one side of said slot and extending thereinto to provide a wedging means by turning against an end of a metal strip 18 that might be inserted at the beginning of a scrolling operation. The jaw may be provided with a series of arcuate links 19, 19' etc. connected to the jaw to determine the radial spacing between the successive turns of the spiral scroll as they are wrapped between them. The upper end of shaft 21 is reduced in diameter to less than the width of the slot 16. The shaft 14 may be hollow with an internal slidable shaft 21 in said hollow. The upper end of shaft 14 may be externally keyed or splined to receive an internally splined spacing collar 22 in any suitable angular relation as may be desired to align the slot 16 in the proper direaction to receive the end of the strip 18. The jaw disc and spacing collar are keyed together as by pin 23, and the knurled cam 17 has an integral shaft 24 with a square end 25 for operation by a wrench, so that the cam may be readily wedged by turning against the side of the strip inserted in slot 16.

Shaft 14 is rotatably mounted in the frame of the carriage 15 against axial displacement by means of collars 25' fixed to the shaft. A pinion 26 fixed to the shaft 14 meshes with a gear 27, which is fixed to a pinion 28 by means of the common stud shaft 29, and pinion 28 meshes with an axially slidable rack 30. The rack 30 is an extension of a piston rod fixed to piston 31 operating in a power operated cylindrical chamber 32 connected to a source of fluid pressure through a solenoid operated control valve 33. The movement of the piston 31 and rack 30 is limited by an axially adjustable stop screw 34 mounted in a wall 35 of the frame of the carriage 15 in alignment with the end of the rack 30. The power cylinder 32 may be mounted on the carriage 15, or, as shown, fixed to the frame 10, and has a vent 44 at its inner end that is connected to an alternate port 44' in control valve 33.

The carriage may be mounted on rollers 36 rotatably mounted at the lower part of the carriage and operating between upper and lower tracks 37 and 38 respectively along the sides of the table frame 10. These rollers may take the form of grooved sheaves 39, the tracks having matching cooperating ridges 40 for said grooves.

Another power cylinder 41 is fixed to each end of frame 10 and has a piston 42 with a piston rod 43 extending axially and horizontally inward to a cross bar on the carriage frame 15, for returning the carriage to its starting position at the end of a scrolling operation. The cylinder 41 may be provided with a solenoid operated three-way valve 45, normally turned to relieve the cylinder or vent it to the atmosphere through a spring-pressed relief valve to provide a drag to the movement of the carriage, but when the solenoid is energized it turns on the supply of pressure fluid to the cylinder to move the carriage outwardly to its normal starting position which may be suitably regulated in accordance with requirements. The opposite end of the cylinder is permanently vented to the atmosphere to eliminate any back pressures in this end.

A third power cylinder 46 has a piston rod extending upwardly and operates the internal shaft 21 to displace the ends of the strips 18 upwardly out of their jaw slots 16 after completion of the scrolling operation. Shaft 21 is normally biased to its lower inoperative position by the return spring 47. A three-way solenoid control valve 53 may be provided to operate this cylinder.

A pair of control switches 48 and 49 may be provided at the front of the table, switch 48 being for starting the operation after the strip has been inserted in the jaws. This holds the solenoid valve 33 open to the source of fluid supply and the movement of rack 30 proceeds until it strikes the stop screw 34. By the time that both racks 30 are stopped by their respective stop screws, the limit switch 50 on one carriage is struck by a projection, such as the head 51 of stop screw 34, on the other to break the circuit of solenoids 33. At this point the stress on the scrolls having ceased suddenly, the slight reverse turning of the gears caused by this relaxation results in the operation of switch 52 which energizes the solenoid valve 53 to operate the power cylinder 46. Switch 52 is operable by the lug on gear 27 in one direction only. This operation of the power cylinder 46 raises the internal shafts 21 to discharge the scroll strip out of the jaws, so that it may be removed and stacked away, while the operator prepares the machine for the next scrolling operation by pressing the other button 49, which energizes solenoid valves 45 to return the carriages to their starting positions. Then the operator may insert the next strip for scrolling into the jaws and a new cycle is then begun.

Adjustment for the length of the scroll at either end of the strip is made by adjusting the stop screw 34. The limit switch 50 is adjusted to operate when both racks have reached their stop screws. Solenoid valve 53 is operated by the switch 52 which is operated in response to a reverse movement of the gears, through a ratchet connection with the lug on the gear 27. After the completion of any scrolling operation, when the scrolling forces are withdrawn by turning off the supply of fluid pressure and venting the cylinder 32 to the atmosphere, both gears 27 are given a slight reverse impulse due to the recoil of the scrolled ends of the strip. This results in the injection of the strip always at the end of any scrolling operation, no matter how the operation itself is adjusted.

Many obvious modifications in the form and arrangement of parts may be made without departing from the spirit and scope of the present invention, as defined in the appended claims.

For example, as already mentioned, the cylinder chamber 32 could be mounted on the carriage 15 and the fluid pressure supply to it could be through a flexible hose.

The solenoid valve outlet for relieving the power pressure could have a resiliently biased pressure outlet valve, as to maintain a drag on the inward movement of the carriage, so as to overcome the tendency of the rack 30 to move the carriage, without or before turning the jaws.

Other obvious modifications will suggest themselves to persons skilled in the art.

What is claimed is:

1. A strip scrolling machine comprising a long table with a table top having an axially extending slot, a pair of carriages under opposite ends of said table top movable axially and having fluid pressure means for biasing them toward said opposite ends of the table, each carriage having a hollow vertical shaft extending through said axially extending slot, a series of scroll spacer links connected at one end to a disc on the end of said shaft above the table top, said disc comprising a jaw disc having gripping jaw means including a vertical radially extending slot across the center of said hollow shaft, and a self tightening eccentric knurled cam mounted at one side of said slot and having a shaft extending through the upper face of said spirally formed cam to provide a square end for use in tightening the knurled cam against the end of a strip inserted in said slot, said scroll spacer links being arcuately curved and of continuously greater radius hinged in series to form a continuous spiral spacer between successive turns of a scroll bent around said spiral cam, said carriages having controlled fluid power means to turn their respective vertical shafts a predetermined number of turns, and a fluid power operated rod in each hollow vertical shaft to automatically lift a scrolled strip off said spiral cams, the carriages being returned by said biasing means to their starting positions at the opposite ends of said table upon release of said scrolled strip for insertion of a new straight strip to be scrolled at both ends upon the next operation of said scrolling machine.

2. A scrolling machine as defined in claim 1, said predetermined number of turns being adjustable for each gripping means by adjustable stops for said fluid power means.

3. A scrolling machine as defined in claim 1, said power means being pneumatic.

4. A scrolling machine as defined in claim 1, said fluid power means including rack and gear means for operating each of said vertical shafts.

5. A scrolling machine as defined in claim 4, and an adjustable stop for each of said rack and gear means.

6. A scrolling machine as defined in claim 1, all said fluid power and pressure means being pneumatically operated pistons reciprocable in cylinders connected to a source of air pressure.

7. A scrolling machine as defined in claim 6, the cylinders of said fluid power means being fixed to said table.

8. A scrolling machine as defined in claim 7, the cylinders of said fluid pressure means being fixed in said carriage.

9. A scrolling machine as defined in claim 6, all said cylinders being fixed to said carriage.

10. A scrolling machine as defined in claim 9, said fluid pressure cylinder having a spring pressed check valve for a vent during the scrolling operation to provide a drag on the axial movement of the jaw means, so that the strip between the two jaw means will be maintained under tension.

References Cited in the file of this patent

UNITED STATES PATENTS

| | | |
|---|---|---|
| 502,841 | Wetmore | Aug. 8, 1893 |
| 642,296 | Carter | Jan. 30, 1900 |
| 797,741 | McBride | Aug. 22, 1905 |
| 904,563 | Rau | Nov. 24, 1908 |
| 1,627,604 | Hittle | May 10, 1927 |
| 2,357,812 | Duer | Sept. 12, 1944 |
| 2,488,257 | Anderson | Nov. 15, 1949 |
| 2,536,738 | Green | Jan. 2, 1951 |
| 2,603,269 | Long | July 15, 1952 |
| 2,649,887 | Lehman | Aug. 25, 1953 |
| 2,710,040 | Boyd | June 7, 1955 |
| 2,744,546 | Williams | May 8, 1956 |
| 2,822,023 | Ahern | Feb. 4, 1958 |